Patented Sept. 8, 1953

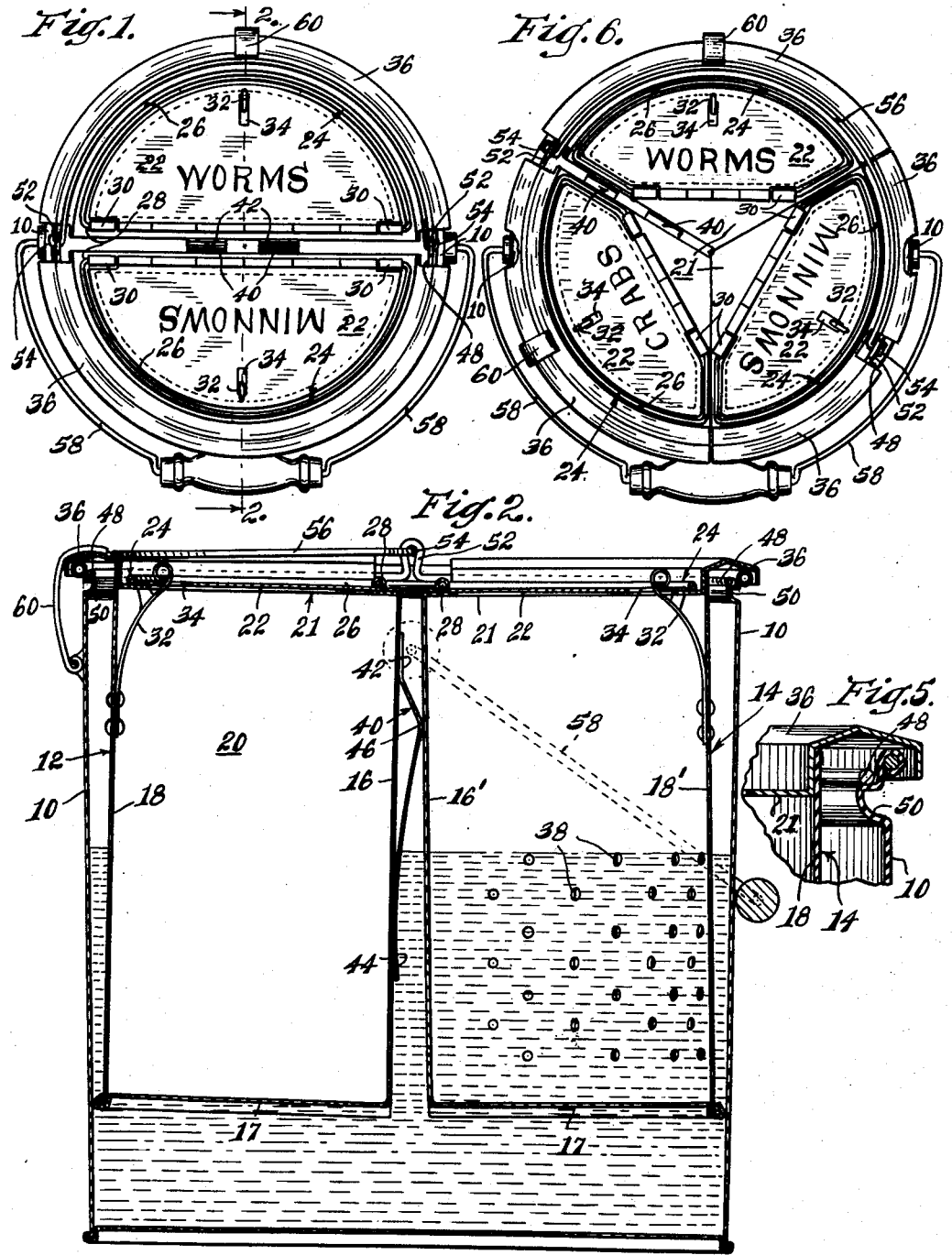

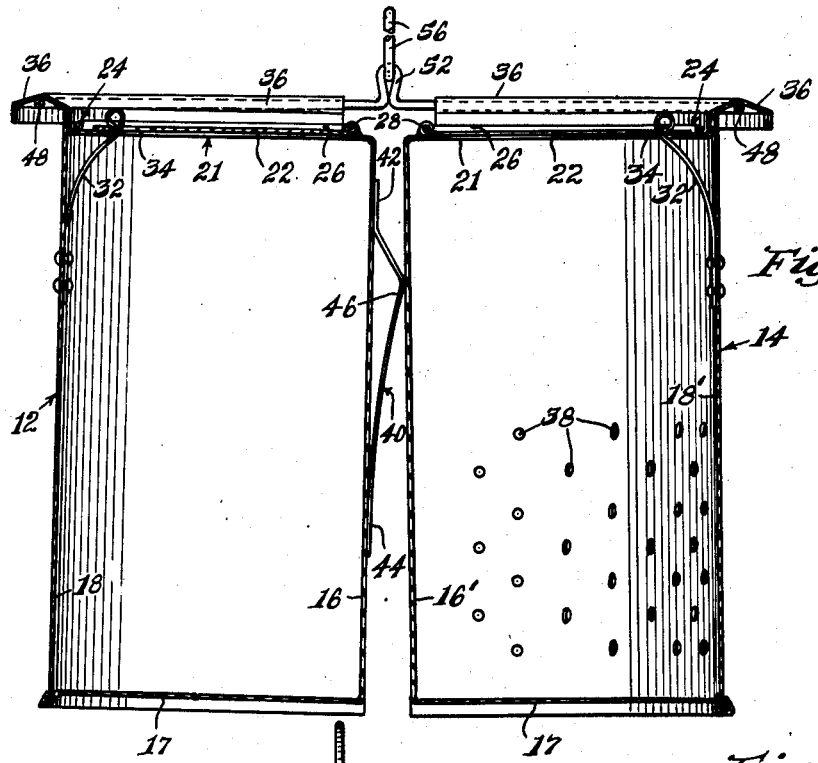
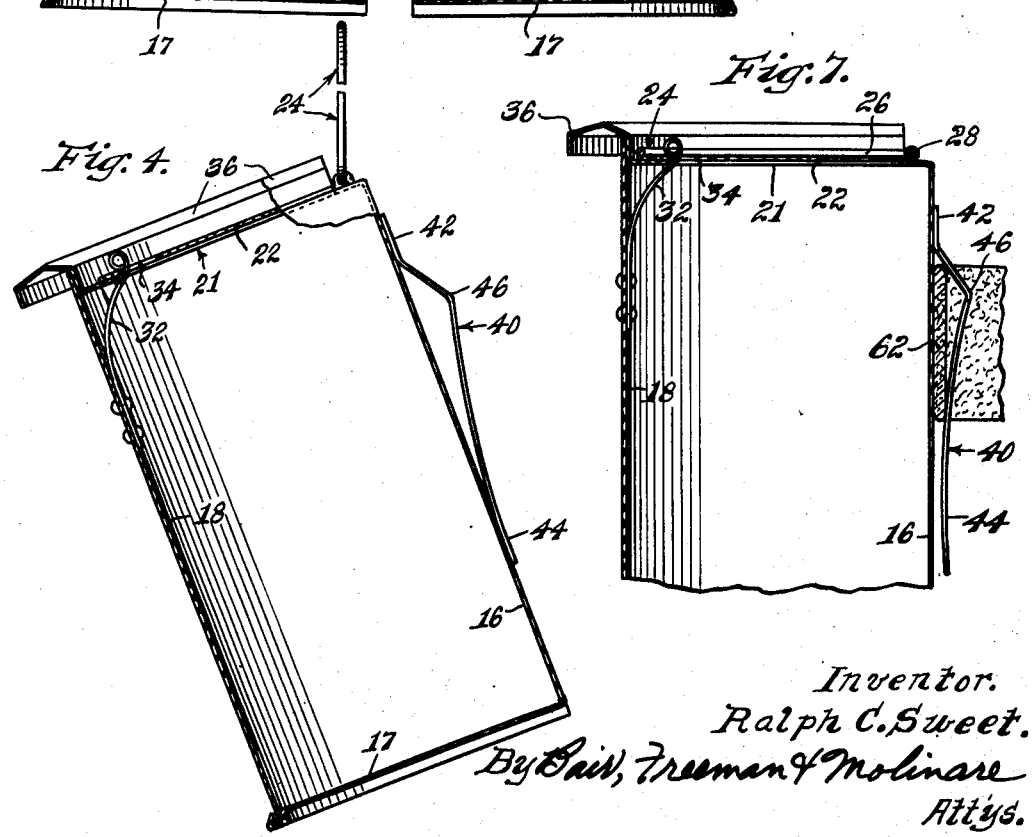

2,651,137

UNITED STATES PATENT OFFICE 2,651,137

BAIT BUCKET

Ralph C. Sweet, Steger, Ill.

Application September 30, 1950, Serial No. 187,723

7 Claims. (Cl. 43—56)

This invention relates to a fisherman's bait bucket and more particularly to a bait bucket adapted to carry a variety of bait.

Fishermen like to have a variety of bait available when fishing. However, bait buckets usually hold but a single type of bait, and a fisherman desirous of using a variety of bait must often carry a number of separate buckets with him. This is, of course, undesirable as buckets are usually bulky objects and carrying a number of them is very troublesome.

Those multi-compartment bait buckets which have been in use do not provide equal accessibility to all compartments, or do not provide separability of each compartment from the other compartments, or do not provide that each compartment may be a wholly separate unit with its individual cover and bail. Furthermore, the separable compartments of multi-compartment bait buckets often have a tendency to rattle around.

Thus, one of the objects of this invention is to provide a bait bucket having a plurality of compartments for carrying a variety of bait and wherein each compartment is equally accessible.

Another object of this invention is to provide a bait bucket having a plurality of compartments for carrying a variety of bait, wherein each compartment is individually a bait bucket.

A further object of this invention is to provide a bait bucket for a variety of bait wherein the water that is used for minnow-type bait is used to keep the other bait cooled.

Still another object of this invention is to provide a water containing bucket having therein a plurality of separate containers for carrying a variety of bait, wherein all the containers may be simultaneously removed from the water containing bucket.

Still a further object of this invention is to provide a water containing bucket having therein a plurality of separate containers, wherein each container is adapted to be used as a separate bait container.

And still a further object of this invention is to provide a water containing bucket having therein a plurality of containers for carrying a variety of bait and wherein the possibility of rattling of the containers within the bucket is substantially reduced.

And still another object of this invention is to provide a bait container which is adapted to be hooked onto a portion of the fisherman's apparel, such as his belt.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a top plan view of a bait bucket including a water containing outer bucket having a pair of bait containers mounted therein;

Figure 2 is an enlarged cross sectional view of the bait bucket and is taken on line 2—2 of Figure 1;

Figure 3 is a view similar to that in Figure 2 showing the inner bait containers removed from the outer bucket and supported by the bail provided for that purpose;

Figure 4 is a cross sectional view of a single bait container hanging from its individual bail;

Figure 5 is an enlarged detail view of the upper edge of the outer bucket showing how the inner bait container is supported thereby;

Figure 6 is a plan view of a modified form of the bait bucket; and

Figure 7 is a detail view showing how the spring clips are hooked onto the fisherman's belt to support the associate bait container.

Referring now to the drawings, there is shown in Figure 2 an outer bucket 10 adapted to hold water therein. A pair of inner buckets generally indicated at 12 and 14 are positioned within the outer bucket 10 with their side walls extending generally vertically within the outer bucket 10. Inner bucket 12 has a flat side wall 16, an arcuate side wall 18 and a bottom wall 17. The arcuate side wall 18 is nearly semicircular and the cross section of the chamber 20 enclosed by walls 16 and 18 is generally semicircular. The walls 16 and 18 of bucket 12 are imperforate. The bucket 12 also has a top wall 21, which in turn has a movable cover member 22 mounted thereon. A bail 24 for supporting bucket 12 is also provided. The bail 24 includes an arcuate portion 26 and a straight portion 28. The bail 24 is secured to the top wall 21 of inner bucket 12 by means of turned over flaps 30. The cover 22 is hinged on the straight portion 28 of bail 24, which straight portion 28 serves as a hinge pin. A spring clasp 32 of a well-known type is mounted on arcuate wall 18 and is adapted to cooperate with aperture 34 in cover 22 to keep the cover 22 closed. An arcuate downwardly facing channel-shaped flange 36 extends from the top wall 21 of inner bucket 12 and is adapted to overlie the upper edge of outer bucket 10, whereby the inner bucket 12 is supported within the outer bucket 10.

The other inner bucket 14 is similar to inner bucket 12 except that the side walls 16' and 18' are perforated with holes 38 to permit the water within the outer bucket 10 to enter into the interior of inner bucket 14.

Mounted on the flat wall 16 of inner bucket 12 are a pair of spring strips generally indicated at 40. These spring strips are vertically disposed with their upper ends 42 secured as by welding to the wall 16 of inner bucket 12. The other end 44 of spring strip 40 bears against the walls 16 of inner bucket 12 and an intermediate portion 46 of spring strip 40 is displaced from the flat wall 16' of inner bucket 12. The spring strips cooperate between the inner buckets 12 and 14 to bias the inner buckets adjacent their lower ends against the walls of the outer bucket 10, as shown in Figure 2, so as to prevent rattling of the inner buckets within the outer bucket 10.

A support ring 48 surrounds the inner buckets and is of smaller dimension than the interior dimension of the outer bucket 10. To prevent the support ring 48 from falling down within the outer bucket 10, a bead 50 on the outer bucket 10 is struck inwardly thereof and is spaced below the upper edge of the outer bucket to provide a recess within which the support ring 48 may be positioned. The support ring 48 has formed therein at points on opposite ends of a diameter thereof, a pair of loops 52 which are adapted to receive the hook ends 54 of a bail 56. The support ring 48, by surrounding the inner buckets 12 and 14 and by being of smaller dimension than the interior dimension of the outer bucket, is positioned under the flanges 36 of the inner buckets and thus when the bail 56 is seized and lifted, the inner buckets 12 and 14 are withdrawn from the outer bucket 10 by means of support ring 48 engaging the flanges 36 of inner buckets 12 and 14. The separate bail 58 is provided for the outer bucket 10 by means of which bail 58, the entire assembly may be carried.

When the outer bucket 10 is filled with water, the imperforate inner bucket 12 will have a tendency to be buoyed up outwardly from the inner bucket 10. Accordingly, a formed spring member 60, made of spring steel or some other resilient material, is provided which is adapted to engage the upper surface of flange 36 so as to apply a force on the inner bucket 12 opposite to the buoyant force on said inner bucket 12. The spring member 60 is formed substantially as shown in Figure 2 and is pivotally mounted on the outer surface of outer bucket 10. The pivotal mounting of spring member 60 permits of simple movement of spring member 60 into or out of engagement with the upper surface of flange 36.

The radius of curvature of the flanges 36 of inner buckets 12 and 14 is larger than the radius of curvature of the upper edge of the outer bucket. Since the flange 36 extends nearly in a semi-circle, it will be found that it is impossible for inner buckets 12 or 14 to slip down into the outer bucket, even if the other inner bucket is not positioned within the outer bucket 10. Furthermore, the flanges 36 on inner buckets 12 and 14 extend all the way along the semicircular arcuate contour of said inner buckets so that the portions of the flange 36 which are adjacent the ends of the arcuate contour of the inner buckets, are spaced closer to a diameter of the support ring 48 than is the center of gravity of the inner bucket. For example, in Figure 1 it will be seen that the ends of flange 36 on either of the inner buckets are adjacent the loops 52 in ring 48. The loops 52 are located at opposite ends of a diameter of ring 48. Because of the shape of the inner bucket, the center of gravity of the inner bucket is spaced further from said diameter of ring 48 than are portions of the flange 36. The portions of the flange 36 closer to said diameter of ring 48 are the portions adjacent the ends of the flanges 36. This is very desirable for then when a single inner bucket is withdrawn from the outer bucket by means of bail 56 and support ring 48, the inner bucket will remain in position on the support ring 48 without the tendency to slip off.

As shown in Figure 7, the spring clips 40 may also be utilized for mounting of the imperforate bucket 12 on the belt 62 of the fisherman. The lower ends 44 of spring strips 40 are simply separated and hooked over the belt 62 and then the bucket 12 may be carried by the fisherman without undue bother.

In Figure 6, a modification of the invention is shown in which three inner buckets are mounted within an outer bucket. In this modification, there are some slight changes in the positioning of the individual bails and the individual covers for the inner buckets. However, the general concept of my invention is still retained. It will be noted that only a single pair of spring strips 40 is necessary to give a clamping action between all of the inner buckets to prevent their rattling around within the outer bucket. In the form shown in Figure 1, the springs 40 bias both inner buckets against the outer bucket. In the form where there are more than two inner buckets, as in Figure 6, the springs 40 are offset from the center of the outer bucket and positioned between any two inner buckets. The springs tend to cause the buckets to move away from each other, but since such movement is limited to arcuate movement along the inner wall of the outer bucket, said inner buckets exert forces on the adjacent inner buckets and thus clamp all of the buckets against each other. The imperforate buckets may be for worms or crabs or frogs while the perforated inner bucket is to be used for minnows or other bait that must be kept in water to be kept alive.

Each inner bucket 12 or 14 may be removed simply by hoisting that bucket by means of its bail 24. Furthermore, both buckets 12 and 14 may be removed simultaneously by the outer bucket by hoisting on the bail 56. Then the water within the outer bucket may be easily and rapidly changed. The water within the outer bucket not only serves to keep the minnows within inner bucket 14 alive, but also serves to keep the bait in the imperforate bucket 12 cool.

It should be understood that many minor details of construction, whether or not shown or described, are incorporated herein in accordance with preferred practice. It will also be understood that the covers 22 of the inner buckets are similar to covers of existing bait buckets and should be perforated to provide ventilation for the contents therein.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A bait bucket comprising an outer bucket, a plurality of inner buckets, said inner buckets having flanges adapted to overlie the upper edge of the outer bucket, whereby the inner buckets are supported by said outer bucket, a ring surrounding said inner buckets, and a bail secured to said ring adapted to withdraw all of the inner buckets from the outer bucket.

2. A bait bucket comprising an outer bucket, a plurality of inner buckets, said inner buckets having flanges adapted to overlie the upper edge of the outer bucket, whereby the inner buckets are supported by said outer bucket, a ring surrounding said inner buckets, a bail secured to said ring adapted to withdraw all of the inner buckets from the outer bucket, said ring being of smaller dimension than the interior dimension of said outer bucket, and means extending inwardly of said outer bucket spaced below the upper edge of said outer bucket adapted to support said ring.

3. A bait bucket comprising an outer bucket for holding water, a plurality of inner buckets having side walls extending generally vertically within said outer bucket from adjacent the top of said outer bucket, the side walls of one of said inner buckets being perforated, the side walls of the remaining inner buckets being imperforate, and latch means on said outer bucket pivotally mounted thereon and swingable selectively to a position to engage a portion of the inner imperforate buckets to keep said imperforate buckets from being buoyed up by the water within said outer bucket.

4. A bait bucket comprising an outer bucket for holding water, a plurality of inner buckets having side walls extending generally vertically within said outer bucket from adjacent the top of said outer bucket, the side walls of one of said inner buckets being perforated, the side walls of the remaining inner buckets being imperforate, said inner buckets having flanges at the upper edges thereof adapted to overlie the upper edge of the outer bucket, whereby the inner buckets are supported by said outer bucket, and latch means pivotally mounted on said outer bucket selectively swingable to a position to engage the upper surface of the flanges on the inner imperforate buckets to keep said imperforate buckets from being buoyed up by the water within said outer bucket.

5. A bait bucket comprising an outer cylindrical bucket for holding water, a pair of inner buckets of generally semicircular cross section, said inner buckets having side walls extending generally vertically within said outer bucket, the walls of one of said inner buckets being perforated, said inner buckets having flanges adapted to overlie the upper edge of the outer bucket, whereby the inner buckets are supported by said outer bucket, spring means positioned between the adjacent flat walls of the pair of said inner buckets, said spring means biasing said inner buckets against said outer bucket, and a latch on said outer bucket pivotally mounted thereon and adapted to be selectively swung to a position to engage the inner imperforate bucket to keep said imperforate bucket from being buoyed up by the water within said outer bucket.

6. A bait bucket comprising an outer bucket, a plurality of inner buckets, a ring surrounding said inner buckets and adapted to be positioned within said outer bucket, said inner buckets having laterally extending flanges overlying said ring, and a bail secured to said ring for withdrawing said ring and all of said inner buckets from said outer bucket.

7. A bait bucket comprising an outer bucket, a plurality of inner buckets, a ring surrounding said inner buckets and adapted to be positioned within said outer bucket, said inner buckets having laterally extending flanges overlying said ring, a bail secured to said ring for withdrawing said ring and all of said inner buckets from said outer bucket, said outer bucket adapted to hold water therein, at least one of said buckets being imperforate, whereby when said outer bucket has water therein, said imperforate bucket is buoyed up outwardly from said outer bucket, and means on said outer bucket engaging a portion of said imperforate bucket to keep said imperforate bucket from being buoyed up.

RALPH C. SWEET.

References Cited in the file of this patent

UNITED STATES PATENTS

| Number | Name | Date |
|---|---|---|
| 321,606 | Hough | July 7, 1885 |
| 447,821 | Griswold | Mar. 10, 1891 |
| 590,212 | Daesch | Sept. 21, 1897 |
| 886,337 | Balken | May 5, 1908 |
| 896,026 | Larkin | Aug. 11, 1908 |
| 1,014,911 | Sheafer | Jan. 16, 1912 |
| 1,373,830 | Petty | Apr. 5, 1921 |
| 1,385,792 | Petty | July 26, 1921 |
| 1,444,367 | Collamer | Feb. 6, 1923 |
| 1,470,199 | Small | Oct. 9, 1923 |
| 1,896,393 | Devine | Feb. 7, 1933 |
| 1,942,756 | Howard | Jan. 9, 1934 |
| 2,182,160 | Nelson | Dec. 5, 1939 |
| 2,295,609 | Shimon | Sept. 15, 1942 |
| 2,513,538 | Williams | July 4, 1950 |
| 2,548,201 | Cromley | Apr. 10, 1951 |

FOREIGN PATENTS

| Number | Country | Date |
|---|---|---|
| 15,750 | Norway | Nov. 12, 1906 |